(12) United States Patent
Mabuchi

(10) Patent No.: US 6,685,343 B2
(45) Date of Patent: Feb. 3, 2004

(54) LIGHT GUIDE PLATE, AND SURFACE LIGHT SOURCE DEVICE AND DISPLAY DEVICE UTILIZING THE SAME

(75) Inventor: Koji Mabuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/207,224

(22) Filed: Jul. 30, 2002

(65) Prior Publication Data

US 2003/0021100 A1 Jan. 30, 2003

(30) Foreign Application Priority Data

Jul. 30, 2001 (JP) ........................... 2001-229689
Mar. 28, 2002 (JP) ........................... 2002-091158

(51) Int. Cl.[7] ............................................. F21V 5/00
(52) U.S. Cl. ..................... 362/331; 362/331; 362/31; 362/26; 349/65
(58) Field of Search .......................... 362/31, 26, 27, 362/330, 331, 339; 385/901, 120, 129; 349/63, 64, 65

(56) References Cited

U.S. PATENT DOCUMENTS 5,771,328 A * 6/1998 Wortman et al. ............. 385/146
6,206,535 B1 * 3/2001 Hattori et al. ................. 362/31
6,330,386 B1 * 12/2001 Wagner et al. ............... 385/120

FOREIGN PATENT DOCUMENTS

JP         2000-89225        3/2000

* cited by examiner

*Primary Examiner*—Sandra O'Shea
*Assistant Examiner*—Ali Alavi
(74) *Attorney, Agent, or Firm*—Arent Fox Kintner Plotkin & Kahn, PLLC

(57) ABSTRACT

A surface light source device includes a light guide plate disposed on an upper surface of a liquid crystal panel unit and a linear light source disposed extending in a direction parallel to a side surface of the light guide plate. A plurality of linear prisms are formed on an upper surface of the light guide plate in a manner of extending in a direction oblique to the side surface. A light irradiated from the linear light source to the light guide plate through the side surface is reflected by a reflecting surface formed by each of linear prisms to be irradiated onto the liquid crystal panel unit provided below a lower surface of the plate. A height of the reflecting surface of each of linear prisms is changed in a lengthwise direction thereof.

8 Claims, 9 Drawing Sheets

MEASURING POSITION IN x COORDINATE DIRECTION (a LINE)

LIGHT GUIDE PLATE, AND SURFACE LIGHT SOURCE DEVICE AND DISPLAY DEVICE UTILIZING THE SAME

BACKGROUND OF THE INVENTION

1. Field of the Invention

The present invention relates to a light guide plate, a surface light source device and a display device. More specifically, the present invention relates to a light guide plate provided with a plurality of prisms on its upper surface and applicable to a liquid crystal display device, and a surface light source device and a display device respectively utilizing the same.

2. Description of the Prior Art

As a conventional such a kind of light guide plate and a surface light source device, there is an example applied to a liquid crystal display device 1 shown in FIG. 16, for example. As shown in FIG. 16, the liquid crystal display device 1 includes a reflective type liquid crystal panel unit 2, a light guide plate 3 provided on an upper surface of the liquid crystal panel unit 2 and a linear light source 4 extending in parallel with one side surface 3a of the light guide plate 3. A plurality of linear prisms 5 are formed parallel with the side surface 3a on an upper surface 3b of the light guide plate 3.

Referring to FIG. 17, a cross-section in a lengthwise direction of each of prisms 5, 5, . . . is formed in a mountain-shape, and a slope 7 opposed to the side surface 3a forms a reflecting surface 7. Specifically, a light irradiated into the light guide plate 3 from the linear light source 4 through the side surface 3a is reflected by each of reflecting surfaces 7,7, . . . and emitted from a lower surface 3c as shown in a dot-lined arrow 6. The emitted light is irradiated onto the liquid crystal panel unit 2, reflected upward by a reflecting plate (not shown) provided within the liquid crystal panel unit 2, and then, emitted outwardly from the upper surface 3b through the light guide plate 3 as shown in one dot-lined arrow 8 in FIG. 17.

It is noted that the further each of prisms 5, 5, . . . is formed from the linear light source 4, the higher the height H of the reflecting surface 7 is, i.e., the larger an area is made. Thus, even in a place far from the linear light source 4 (small in amount of emitted light to the reflecting surface 7), an amount of emitted light equal to that in a place near the linear light source 4 (large in amount of emitted light to the reflecting surface 7) can be obtained, and therefore, it is possible to obtain uniform brightness distribution throughout a lower surface 3c.

An example of another prior art is disclosed in a Japanese patent Laying-open No. 2000-89225 [GO2F1/1335] laid-open on Mar. 31, 2000. This prior art is intended to prevent occurrence of moiré fringes due to interference by a prism and a pixel pattern of a liquid crystal display element by providing a predetermined angle between the lengthwise direction of the linear prism formed in plural on the light guide plate and a repetition direction of the pixel pattern of the liquid crystal display element.

It is probable that a combination of such the two prior arts can realize a light guide plate and a surface light source device having uniform brightness distribution and no moiré fringes.

However, only a combination of the above-described prior arts causes a following problem. That is, in a case a predetermined angle between a lengthwise direction of a plurality of prisms each of which has the reflecting surface different in height and a repetition direction of the pixel pattern of the liquid crystal display element (a direction vertical to the lengthwise direction of the linear light source) is formed, the height of each of prisms is different from each other along length direction of the linear light source. In such a case, even in the same distance from the linear light source, there occurs difference in amount of emitted light in the lengthwise direction of the linear light source, and therefore, there is a problem that uniform brightness distribution cannot be obtained.

SUMMARY OF THE INVENTION

Therefore, it is a primary object of the present invention to provide a novel light guide plate, and a surface light source device and a display device respectively utilizing the same.

Another object of the present invention is to provide a light guide plate capable of uniformalizing brightness distribution and preventing occurrence of moire fringes, and a surface light source device and a display device respectively utilizing the same.

The other object of the present invention is to provide a novel light guide plate capable of freely controlling brightness distribution, and a surface light source device and a display device respectively utilizing the same.

The light guide plate according to the present invention comprises a side surface to which a light is irradiated; and an upper surface formed with a plurality of lengthwise prisms extending in a direction oblique to the side surface, wherein a height of a plurality of slopes forming the plurality of prisms and opposed to the side surface is changed in a lengthwise direction of the prisms.

The light guide plate is formed with a plurality of prisms on its upper surface. Then, a height of slopes each of which forms prisms is changed in a lengthwise direction of the prisms. Accordingly, an amount of the light reflected by the slopes and emitted can be adjusted in a lengthwise direction of the prisms, and therefore, the brightness distribution can be freely controlled.

Consequently, a following surface light source device and a display device respectively utilizing such the light guide plate are also designed so as to control the brightness distribution freely and suitably.

A surface light source device comprises: a light guide plate including a side surface to which a light is irradiated and an upper surface formed with a plurality of lengthwise prisms extending in a direction oblique to the side surface, wherein a height of a plurality of slopes forming the plurality of prisms and opposed to the side surface is changed in a lengthwise direction of the prism; and a linear light source disposed extending in a direction parallel to the side surface.

A display device comprises: a light guide plate including a side surface to which a light is irradiated, an upper surface formed with a plurality of lengthwise prisms extending in a direction oblique to the side surface and a lower surface opposed to the upper surface, wherein a height of slopes forming the plurality of prisms and opposed to the side surface is changed in a lengthwise direction of the prisms; a linear light source disposed extending in a direction parallel to the side surface; and a liquid crystal display panel disposed on the lower surface.

Another light guide plate according to the present invention comprises: a side surface to which a light is irradiated; and an upper surface formed with a plurality of prisms extending in a direction oblique to the side surface, wherein a height of a plurality of slopes forming the plurality of prisms and opposed to the side surface is made higher away from the side surface.

In this light guide plate, a light irradiated from the side surface of the light guide plate is reflected by each reflecting surface forming each prism and opposed to the side surface. The height of the slope is higher away from the side surface, i.e., an incidence surface. Accordingly, even in a place far from the incidence surface, an amount of emitted light equal to that in the place nearer the incidence surface can be obtained. Therefore, although the prisms are formed in a direction oblique to the side surface to which a light is irradiated, since a height of the slopes of the prisms is changed according to the distance from the side surface, uniform brightness distribution can be obtained and occurrence of moiré fringes can be prevented.

Then, the same advantages can be expected in a following surface light source device and display device respectively utilizing the above-described light guide plate.

A surface light source device comprises: a light guide plate including a side surface to which a light is irradiated and an upper surface formed with a plurality of prisms extending in a direction oblique to the side surface, wherein a height of a plurality of slopes forming the plurality of prisms and opposed to the side surface is made higher away from the side surface; and a linear light source disposed extending in a direction parallel to the side surface.

A display device comprises: a light guide plate including a side surface to which a light is irradiated, an upper surface formed with a plurality of prisms extending in a direction oblique to the side surface and a lower surface opposed to the upper surface, wherein a height of a plurality of slopes forming the plurality of prisms and opposed to the side surface is made higher away from the side surface; a linear light source disposed extending in a direction parallel to the side surface; and a liquid crystal display panel disposed on the lower surface.

In either case, the prisms may be formed so as to come into contact with each other in a width direction. In this case, it is preferable that a cross-section of each prism in a lengthwise direction is formed in a mountain-shape.

Furthermore, the prisms may be formed to be spaced from each other in a width direction. In this case, it is preferable that a cross-section of each prism in a lengthwise direction is formed in an approximately V-shape.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
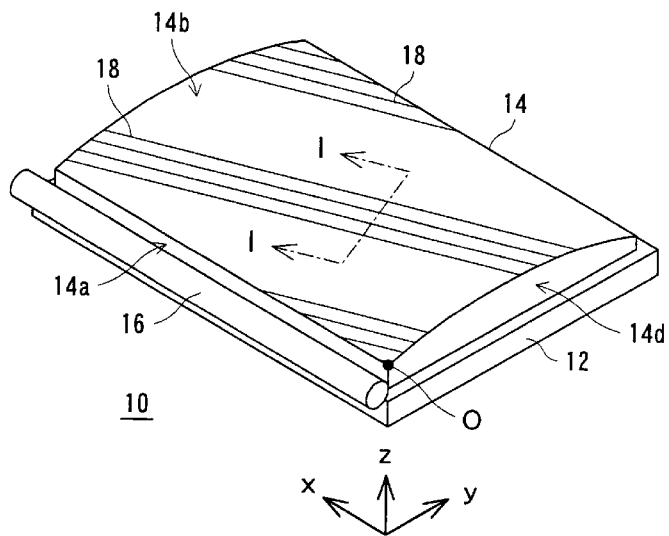
FIG. 1 is a perspective view showing a first embodiment of the present invention.

Referring to FIG. 1, a liquid crystal display device 10 of a first embodiment according to the present invention includes a liquid crystal display panel unit 12 in a plate-shape, a light guide plate 14 provided on an upper surface of the liquid crystal display panel unit 12, and a linear light source 16 extending parallel with a side surface 14a of the light guide plate 14. The liquid crystal display panel unit 12 is a reflective type and has, although not shown in detail, a reflecting plate, a liquid crystal layer, a color filter, a glass plate and a deflecting plate laminated in this order on a glass substrate. The light guide plate 14 is made of an acrylic resin and has a large number of linear prisms 18 (described later) formed in parallel with each other on its upper surface 14b. A fluorescent lamp such as a hot-cathode tube, a cold-cathode tube and etc., light emitting diodes arranged in a linear manner, or an incandescent lamp or an organic light emitting member arranged in a linear manner can be utilized as the liner light source 16.

Figure 2:
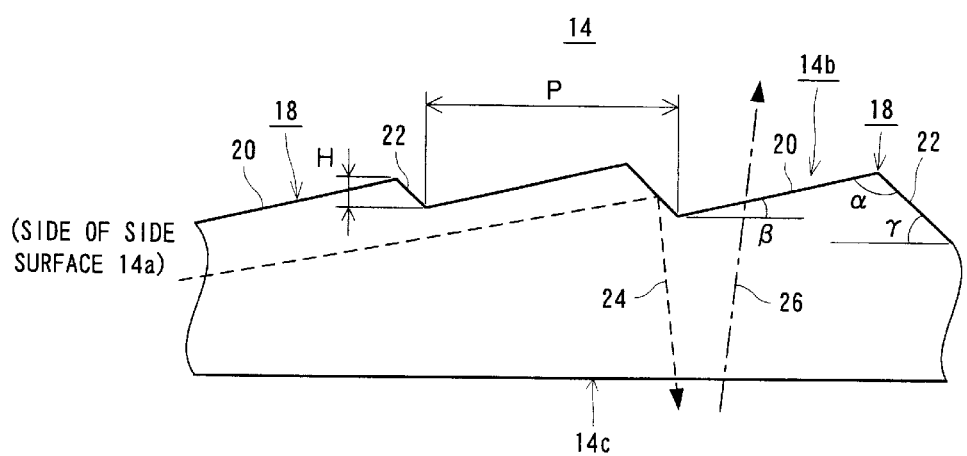
FIG. 2 is a partially enlarged view showing a shape of prisms formed on a light guide plate in cross-section at a line I—I of FIG. 1.

Referring to FIG. 2, a cross-section in the lengthwise direction of each of linear prisms 18, 18, . . . is formed in mountain-shape, and one slope 22 opposed to the linear light source 16 out of the slopes 20 and 22 forming a mountain functions as a reflecting surface for reflecting a light irradiated from the linear light source 16. That is, a light emitted from the linear light source 16 is irradiated from the side surface 14a to the light guide plate 14, reflected by each of the reflecting surfaces 22, 22 . . . formed by each of prisms 18, 18 . . . , as shown in a dot-lined arrow 24 in FIG. 2 and then, emitted from a lower surface 14c of the light guide plate 14. The emitted light is irradiated onto the liquid crystal display panel unit 12, transmitted through the above-described liquid crystal layer and etc., and then, reflected upward by the reflecting plate so as to be transmitted through the liquid crystal layer again. Then, the light transmitted through the liquid crystal layer is emitted from the upper surface 14b of the light guide plate 14 to the outside through the light guide plate 14 as indicated by one dot-lined arrow 26 in FIG. 2.

Figure 3:
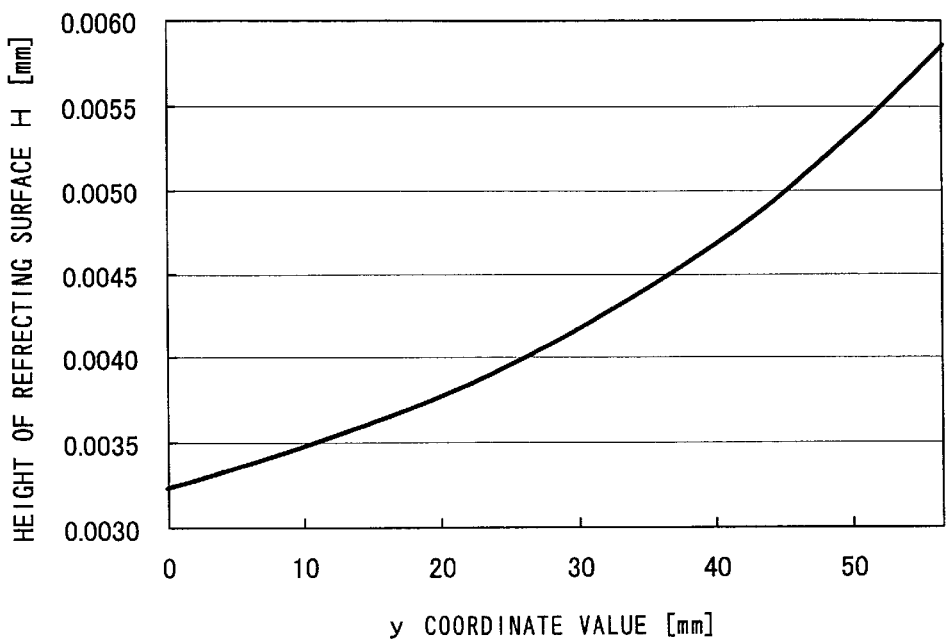
FIG. 3 is an illustrative view showing in a form of graph a height of a reflecting surface of the prism with respect to a y coordinate value of the light guide plate of FIG. 1 embodiment.
Figure 4:
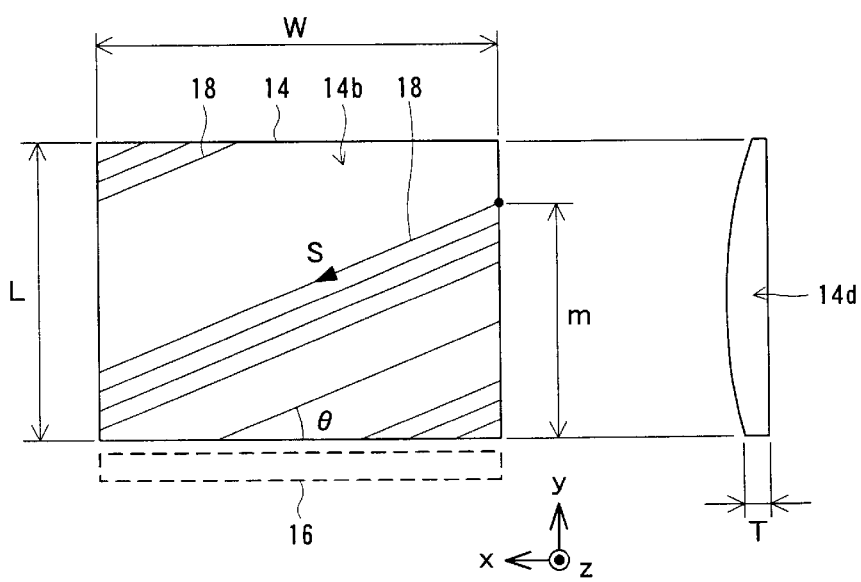
FIG. 4 is an illustrative view showing an appearance of the light guide plate of FIG. 1 embodiment.

Incidentally, each of the prisms 18, 18, . . . is formed such that the further the prism 18 is located from the linear light source 16, the higher the height H of the reflecting surface 22 is, i.e., the larger an area of the reflecting surface 22 is. More specifically, as shown in FIG. 1 with a reference symbol O, assuming that rendering one end (right side of FIG. 1) sandwitched by the side surface 14a and the upper surface 14b of the light guide plate 14 as a base point, a direction along the linear light source 16 from the base point O is an x direction, a direction along the upper surface 14b of the light guide plate 14 from the base point O and vertical to the linear light source 16 is a y direction, and a direction perpendicular to each of the x direction and the y direction (a direction along a normal of the lower surface 14c of the light guide plate 14) is a z direction, the height H of each of reflecting surfaces 22, 22, . . . with respect to the y direction is changed as shown in FIG. 3. In addition, in the first embodiment the light guide plate 14 being 74.23 [mm] in width indicated by a reference symbol W and 56.56 [mm] in length L is utilized as shown in FIG. 4, and FIG. 3 shows the height H of each of reflecting surfaces 22, 22, . . . with respect to the y direction of this light guide plate 14.

Figure 5:
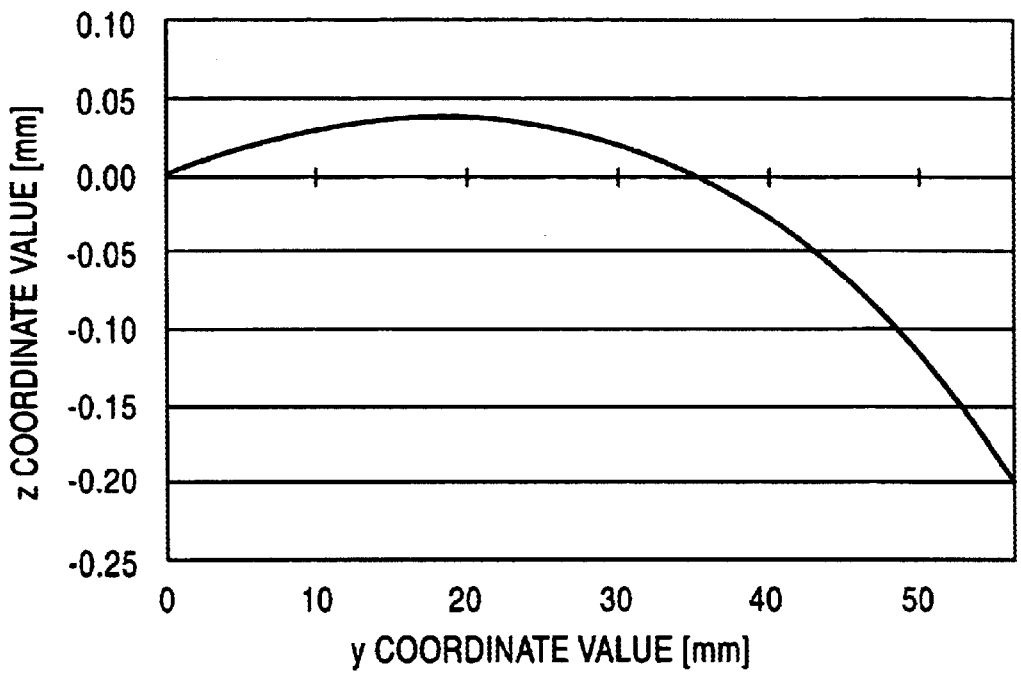
FIG. 5 is an illustrative view showing in a form of graph a z coordinate value with respect to the y coordinate value of the light guide plate of FIG. 1 embodiment.

A vertical angle α of each prism 18 shown in FIG. 2, an angle β formed by the slope 20 and the lower surface 14c of the light guide plate 14, and an angle γ formed by the reflecting surface 22 and the lower surface 14c of the light guide plate 14 are made constant. Then, a pitch (a space between valleys) P of the prisms 18, 18, . . . is also made constant. Accordingly, in viewing the light guide plate 14 from the side surface 14b orthogonally intersecting to the side surface 14a, a side of the upper surface 14b looks like a swollen shape such as a swelling drum-shape or a barrel shape as exaggeratively shown in FIG. 4. Detailed description of the shape is shown in FIG. 5. FIG. 5 graphs an envelope joining apexes of the prisms 18, 18 . . . in the above-described y direction. As can be understood from the graph, it appears that the upper surface 14b of the light guide plate 14 is changed in an arc-shape in the y direction. It is noted that a thickness T of the light guide plate 14 shall be 1.00 [mm] at the side surface 14a.

Furthermore, each of prisms 18, 18, . . . is formed such that each of length directions thereof is tilted with respect to the side surface 14a (strictly speaking, a lined direction of a pixel pattern (not shown) of the liquid crystal display panel unit 12) for the purpose of avoiding an occurrence of more fringes. With referring to FIG. 4, an angle θ formed by a lengthwise direction of each of prisms 18, 18, . . . and a lengthwise direction of linear light source 16, i.e., side surface 14a shall be 15°.

Figure 6:
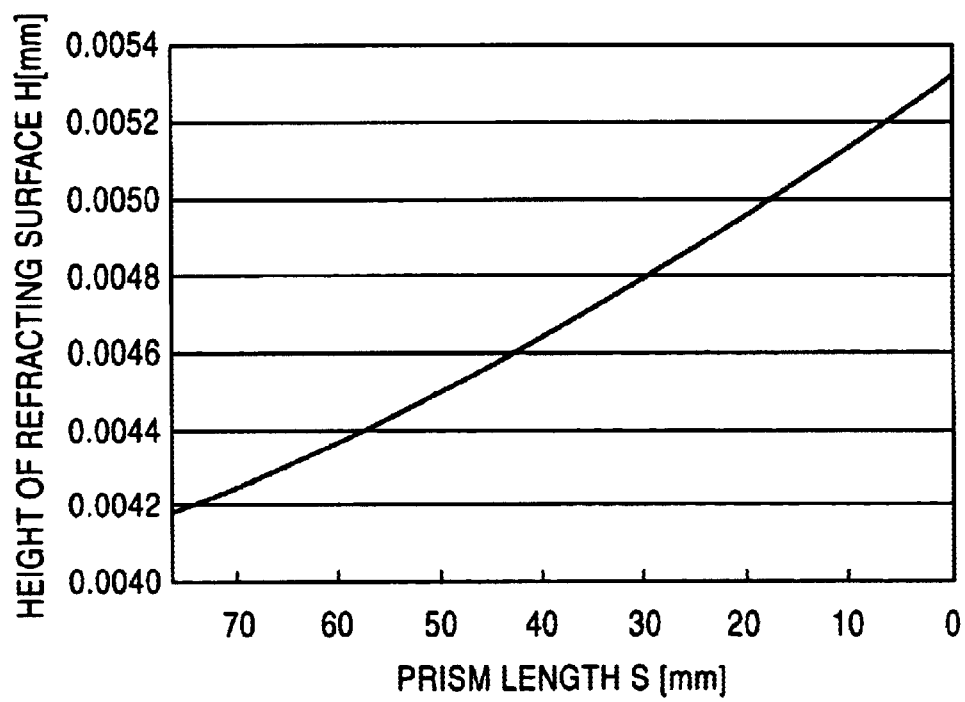
FIG. 6 is an illustrative view showing in a form of graph a height of the reflecting surface of a prism with respect to a lengthwise direction of the prism.

In the first embodiment, the height H of the reflecting surface 22 in the lengthwise direction is changed every prism 18. More specifically, as shown in FIG. 6, the further the reflecting surface 22 is from the linear light source 16 (side surface 14a), the higher the height H of the reflecting surface 22 is. Thus, even if the light guide plate 14 is cut at any position in the y direction, the height H of the reflecting surface 22, 22, . . . appearing on the cut surface is coincident with each other, and a relation of the above-described FIG. 3 holds. That is, the height H of each of reflecting surfaces 22, 22, . . . (i.e, a value in the z direction) becomes a function of only a value in the y direction. It is noted that FIG. 6 is a height H graphed in the lengthwise direction of the prism 18 located at a predetermined space m=50 [mm] apart from the base point O to the y direction.

By making the height H of each of reflecting surfaces 22, 22, . . . constant with respect to spaces from the linear light source 16 along the linear light source 16, it is possible to uniform the brightness along the linear light source 16. Accordingly, even if the lengthwise direction of each of prisms 18, 18, . . . is tilted with respect to the lengthwise direction of the linear light source 16, uniform brightness distribution can be obtained throughout an emitting surface of the light guide plate 14, i.e., the lower surface 14c thereof.

Figure 7:
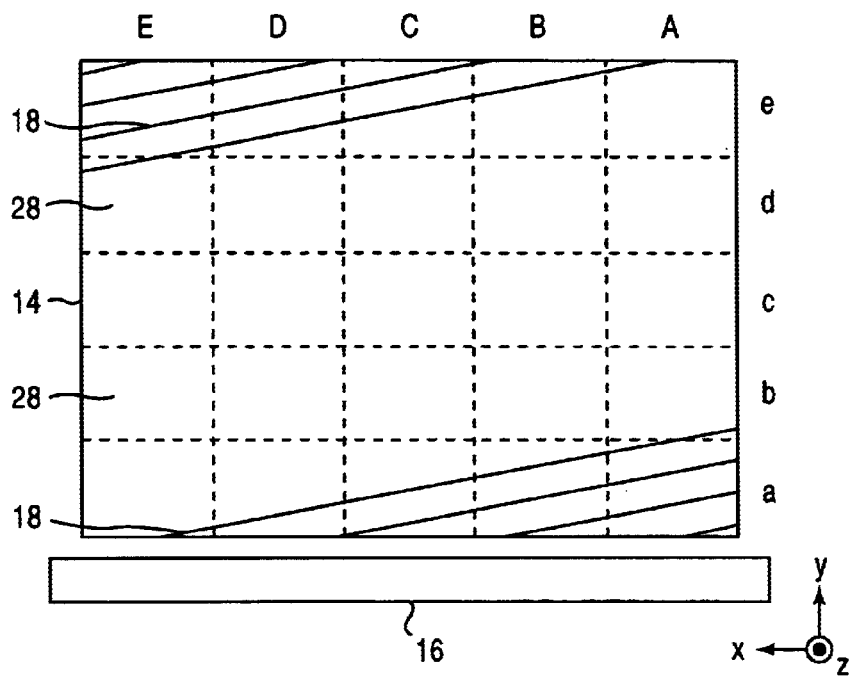
FIG. 7 is an illustrative view showing an outline of a simulation for demonstrating an effect of FIG. 1 embodiment.

For demonstrating the effect, the inventor(s) performed a following simulation. That is, as shown in FIG. 7, the lower surface 14c (emitting surface) of the light guide plate 14 is equally divided into areas 28, 28, . . . of 25 comprising 5 columns of A to E along the x direction and 5 rows of a to e along the y direction. With turning on the linear light source 16, brightness at each of areas 28, 28, . . . is calculated. The result is shown in a table 1.

TABLE 1

|   | A | B | C | D | E |
|---|---|---|---|---|---|
| a | 94.9% | 93.8% | 95.0% | 94.2% | 98.8% |
| b | 100.0% | 100.0% | 98.2% | 98.0% | 99.2% |
| C | 100.0% | 97.8% | 98.6% | 99.7% | 99.3% |
| D | 98.6% | 97.9% | 98.5% | 97.4% | 98.3% |
| E | 92.9% | 94.9% | 96.5% | 93.9% | 91.7% |

It is noted that in the table 1, on the assumption that a maximum value of the brightness obtained by the calculation is 1, and a ratio of brightness of each of area 28, 28, . . . to the maximum value (relative brightness) is expressed in percent. Then, the relative brightness of each of areas 28, 28, . . . at a column a in the table 1 is graphed in FIG. 8.

Figure 8:
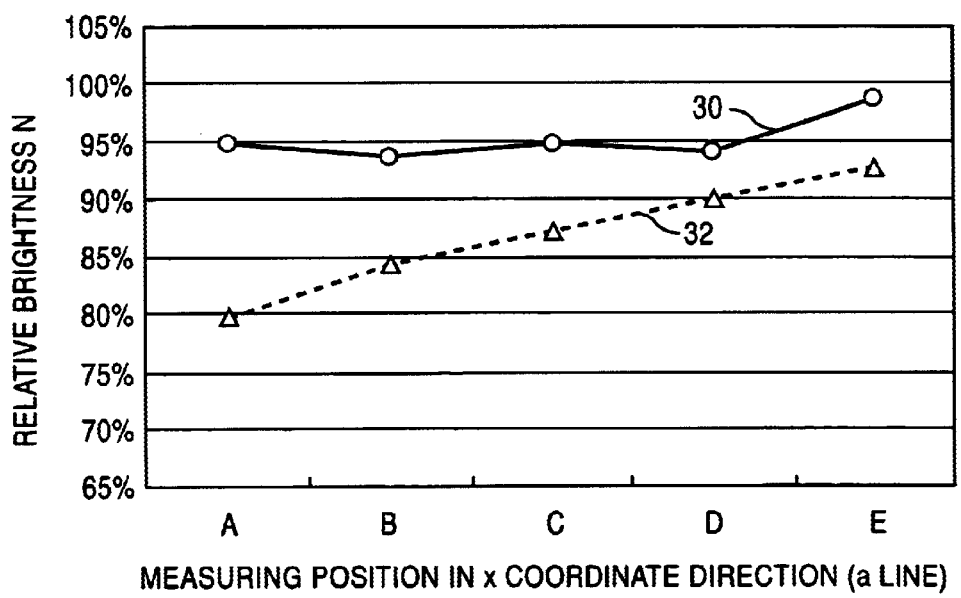
FIG. 8 is a graph showing a result of calculation of brightness in an x direction in the FIG. 7 simulation.

In FIG. 8, a graph indicated by a solid line 30 is a simulation result of the relative brightness at the column a in the first embodiment. For reference, a combination of two above-described prior arts is also simulated under the same condition as the first embodiment. The result is indicated by a dot-lined graph 32. As can be understood from this Figure, for a combination of two prior arts, brightness is largely (79.7%~92.8% in calculated value) changed along the linear light source 16 while for the first embodiment, constant brightness (93.8%~98.8% in the table 1) is obtained along the linear light source 16 (y direction).

Figure 9:
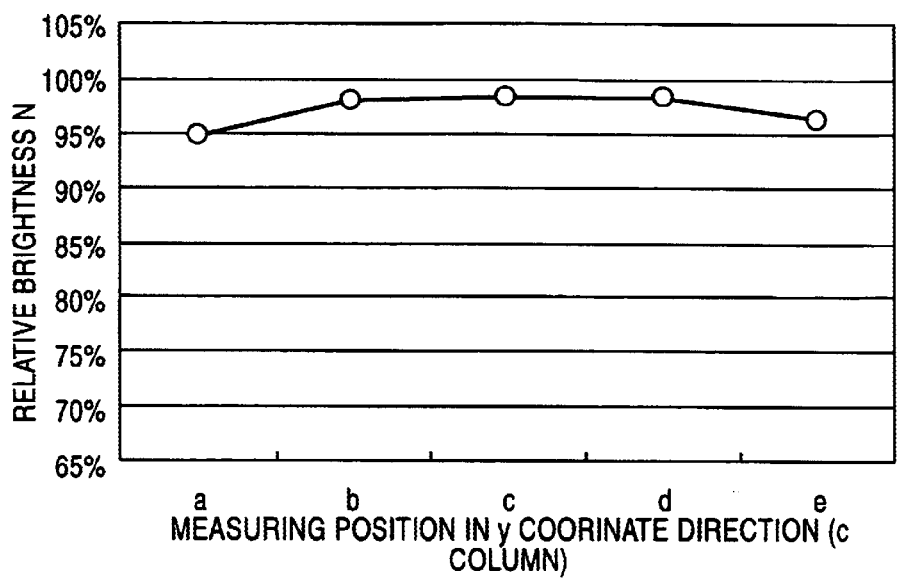
FIG. 9 is a graph showing a result of calculation of brightness in a y direction in FIG. 7 simulation.

Furthermore, the relative brightness of each of areas 28, 28 . . . at a line C in the table 1 is graphed in FIG. 9. As shown in FIG. 9, it is probable according to the first embodiment that constant brightness (95.0%~98.6% from the table 1) can be obtained also in the direction away from the linear light source 16 (x direction) irrespective of a distance from the linear light source 16.

Figure 10:
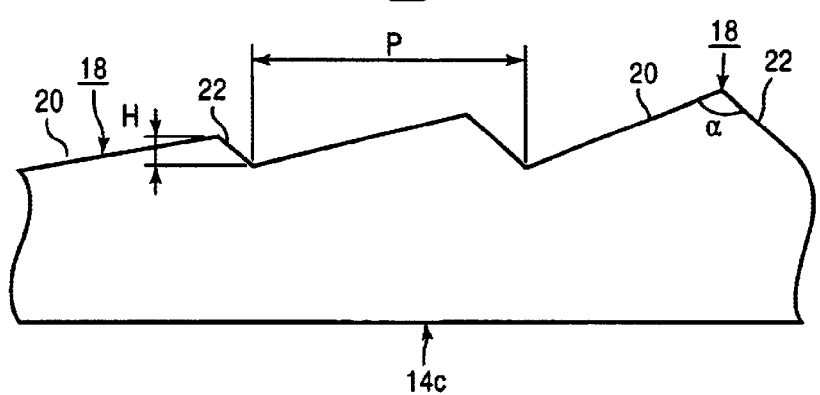
FIG. 10 is a partially enlarged view showing a shape of a prism applicable in place of the prism in FIG. 2.
Figure 11:
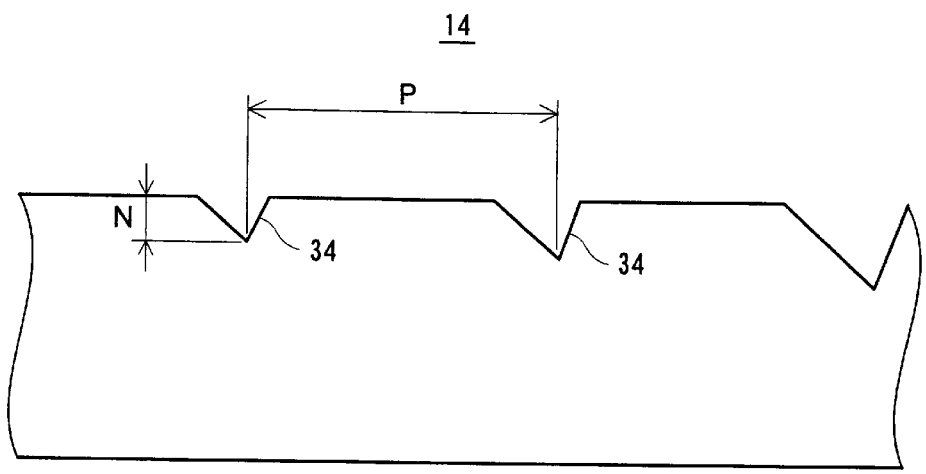
FIG. 11 is a partially enlarged view showing a shape of prisms different from the prisms in FIG. 10.

It is noted that although each of prisms 18, 18, . . . takes a form or shape of FIG. 2 in the first embodiment, it is not limited to this form or shape. For example, as shown in FIG. 10, each prism takes a form such that a height of each valley of each of prisms 18, 18, . . . (a distance from the lower surface 14c to the valley) is constant. In this case, the height of each valley is made constant by adjusting each of vertical angles of each of prisms 18, 18, . . . . Alternatively, as shown in FIG. 11, a prism constructed by V-shaped grooves 34 may be intermittently formed in plural in the width direction. In this case, a brightness can be controlled by changing a depth N of each of grooves 34, 34, . . . .

Furthermore, although a description is made on a case that the present invention is applied to a surface light source device of a so-called front light system in which a light is irradiated from the upper surface (surface) of the reflective type liquid crystal panel unit 12, it is not limited to this. That is, the present invention may be applied to a surface light source device of a so-called backlight system in which a light is radiated from the lower surface (back side) of a transmissive or semi-transmissive liquid crystal panel unit.

Figure 12:
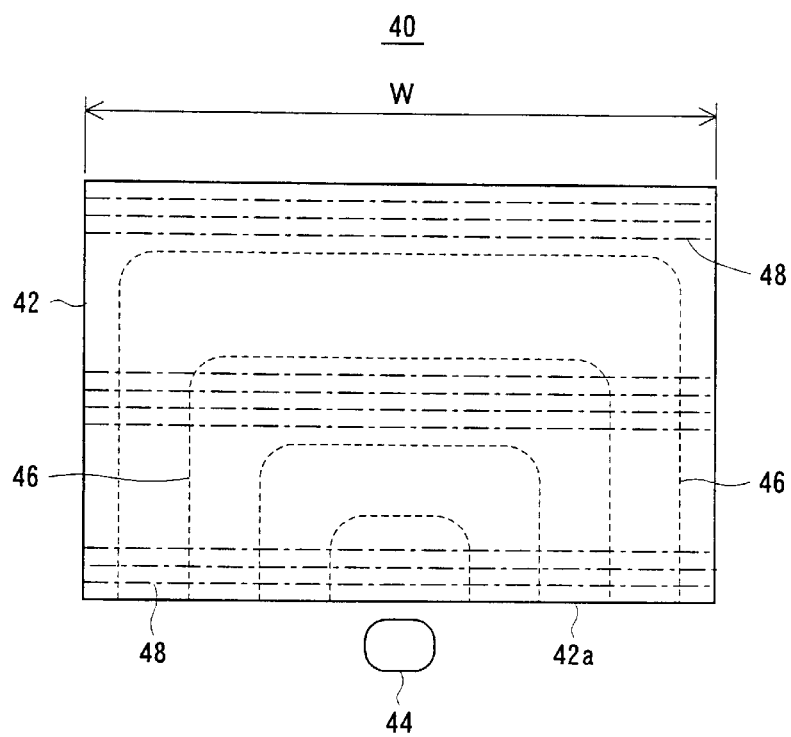
FIG. 12 is a plan view showing a second embodiment of the present invention.

Referring to FIG. 12, a liquid crystal device 40 of a second embodiment of the present invention intends to obtain uniform brightness distribution by utilizing a point light source 44 smaller than a size of the light guide plate 42 in width W.

Figure 13:
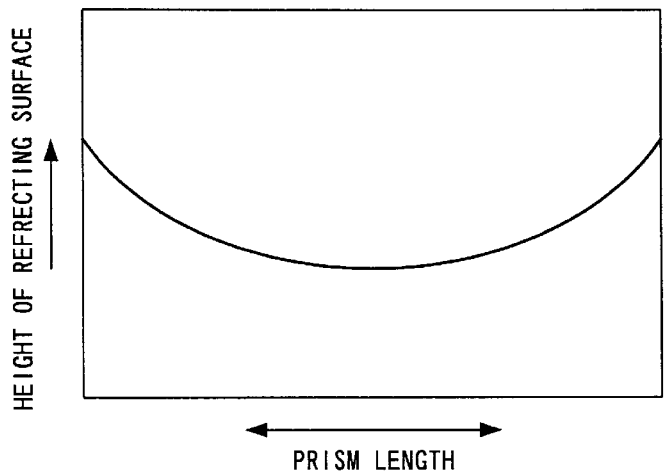
FIG. 13 is an illustrative view showing in a form of graph a height of the reflecting surface with respect to the lengthwise direction of prisms in the FIG. 12 embodiment.

Specifically, a mere use of the point light source 44 causes a schematically fun-shaped brightness distribution centered on the point light source 44 as shown in dotted lines 46, 46 . . . in FIG. 12. Then, as shown in one-dotted lines 48, 48 . . . in FIG. 12, for example, linear-typed prisms are formed such that the prisms extend parallel to the side surface 42a of the light guide plate 42, and such that the reflecting surfaces of the prisms are changed in the lengthwise direction of each of prisms 48 by forming the prisms in a manner that the further the prisms locate from the side surface 42a, the higher the height of the reflecting surfaces is. Specifically, as shown in FIG. 13, the height of the reflecting surface is lowered at a center of the prism 48 while the height of the reflecting surface is heightened toward the end.

Thus, the brightness can be freely controlled by changing the height of the reflecting surface in the lengthwise direction of each prism 48, and therefore, even if the point light source 44 having a width W smaller than that of the brightness light guide plate 42 is utilized, uniform brightness distribution can be obtained.

It is noted that in a case that each of prisms 48, 48, . . . is formed so as to extend in a oblique direction to the side surface 42a of the light guide plate 42 similarly to the above-described FIG. 1 embodiment, it is needless to say that the art of the second embodiment can be applicable.

Figure 14:
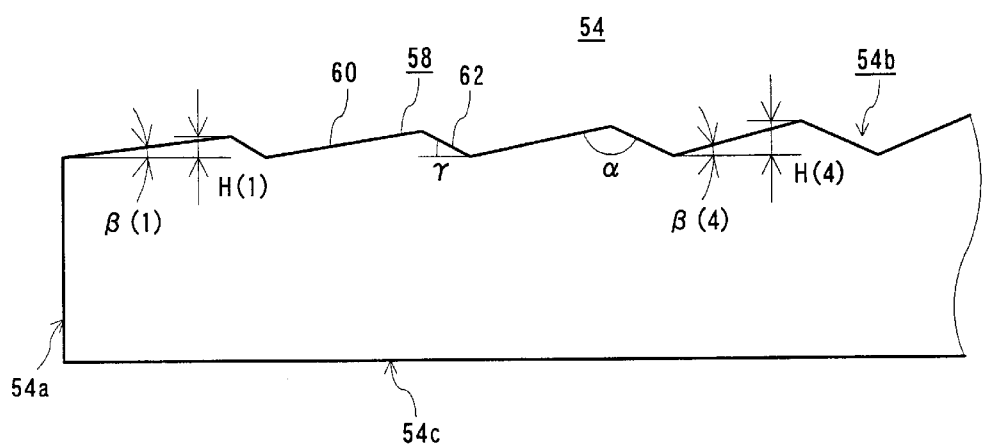
FIG. 14 is a partially enlarged view showing prisms of a third embodiment in the present invention.

In a third embodiment shown in FIG. 14, a single prism 58 is constructed by a slope 60 formed with an angle β (i) against a plane surface formed by an envelope of the valley of each prism 58 and a reflective surface 62 formed with an angle of an included angle or vertical angle (=α) of a prism finishing bite (not shown) against the slope 60. By changing a tilt of the prism finishing bite having the included angle α, the angle β (i) which the slope 60 makes with the plane (a plane formed by an envelope of a valley of the prism 58) can be changed, whereby a variable depth H (i) of the prism 58 can be obtained. Herein, by controlling a position coordinate of an apex or vertex of the prism finishing bite, the depth H (i) of the prism is made variable, and therefore, the above-described plane can be formed.

Figure 15:
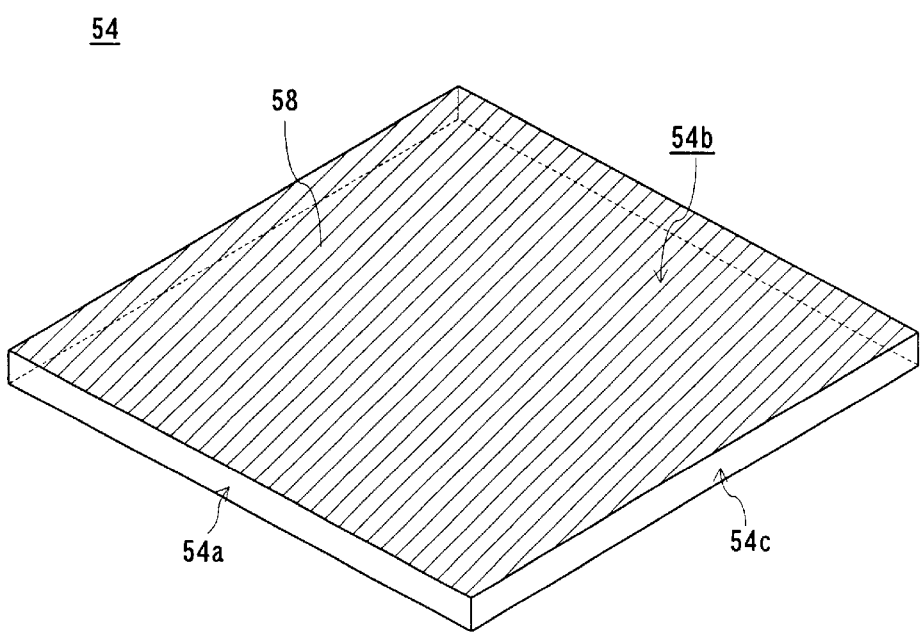
FIG. 15 is an appearance perspective view showing a light guide plate of the third embodiment.
Figure 16:
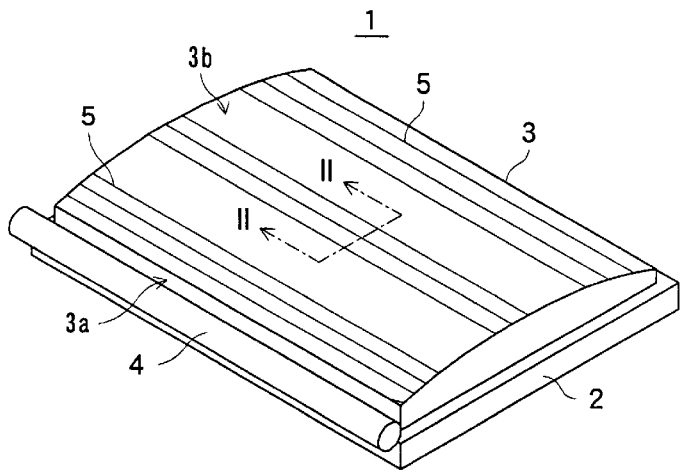
FIG. 16 is an appearance perspective view showing one example of a conventional liquid crystal display device.
Figure 17:
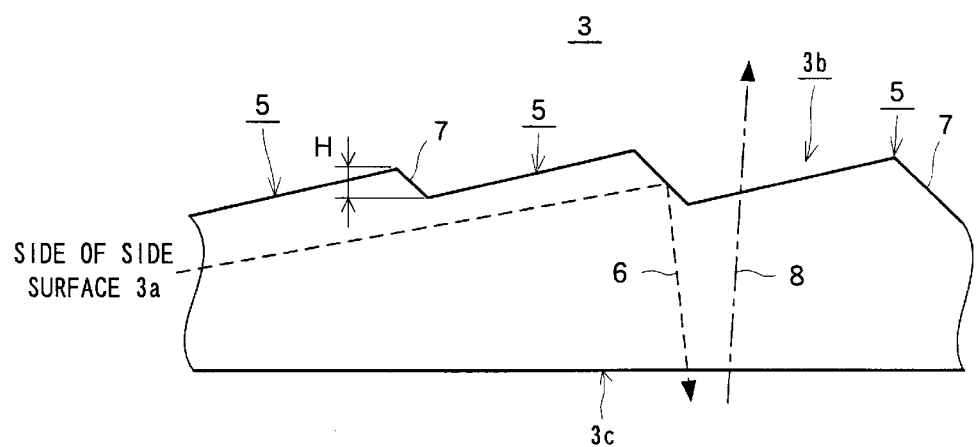
FIG. 17 is a partially enlarged view showing a shape of prisms formed on the light guide plate in cross-section at a line II—II of FIG. 16.

Thus, since the prism finishing surface provided with each prism 58 is formed such that the thickness of a incidence surface 54a can kept constant in the length direction of the incidence surface 54a, and height distribution of the prism surface in a direction vertical to the incidence surface 54a can be constant as shown in FIG. 15, a light guide plate 54 can be in an approximately flat plate form or wedge form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light guide plate, comprising:

a side surface to which light is irradiated; and an upper surface formed with a plurality of lengthwise prisms extending in a direction oblique to said side surface, wherein a height of a plurality of slopes forming said plurality of prisms and opposed to said side surface is changed in a lengthwise direction of the prisms, and the oblique direction is determined by a predetermined angle.

2. A light guide plate, comprising:

a side surface to which light is irradiated; and an upper surface formed with a plurality of prisms extending in a direction oblique to said side surface, wherein a height of a plurality of slopes forming said plurality of prisms and opposed to said side surface is made higher away from said side surface, and the oblique direction is determined by a predetermined angle.

3. A surface light source device, comprising:

a light guide plate including a side surface to which a light is irradiated and an upper surface formed with a plurality of lengthwise prisms extending in a direction oblique to said side surface, wherein a height of a plurality of slopes forming said plurality of prisms and opposed to said side surface is changed in a lengthwise direction of the prisms; and a linear light source disposed extending in a direction parallel to said side surface, wherein the oblique direction is determined by a predetermined angle.

4. A surface light source device, comprising:

a light guide plate including a side surface to which a light is irradiated and an upper surface formed with a plurality of prisms extending in a direction oblique to said side surface, wherein a height of a plurality of slopes forming said plurality of prisms and opposed to said side surface is made higher away from said side surface; and a linear light source disposed extending in a direction parallel to said side surface, wherein the oblique direction is determined by a predetermined angle.

5. A display device, comprising:

a light guide plate including a side surface to which a light is irradiated, an upper surface formed with a plurality of lengthwise prisms extending in a direction oblique to said side surface, and a lower surface opposed to said upper surface, wherein a height of a plurality of slopes forming said plurality of prisms and opposed to said side surface is changed in a lengthwise direction of the prisms;

a linear light source disposed extending in a direction parallel to said side surface and a liquid crystal display panel disposed on said lower surface, and the oblique direction is determined by a predetermined angle.

6. A display device, comprising:

a light guide plate including a side surface to which a light is irradiated, an upper surface formed with a plurality of prisms extending in a direction oblique to said side surface, and a lower surface opposed to said upper surface, wherein a height of a plurality of slopes forming said plurality of prisms and opposed to said side surface is made higher away from said side surface;

a linear light source disposed extending in a direction parallel to said side surface and a liquid crystal display panel disposed on said lower surface, wherein
the oblique direction is determined by a predetermined angle.

7. A light guide plate according to any one of claims 1 to 6, wherein said plurality of prisms are formed so as to come into contact with each other in a width direction and each of a cross-section in a lengthwise direction of said plurality of prisms is formed in a mountain-shape.

8. A light guide plate according to any one of claims 1 to 6, wherein said plurality of prisms are formed and spaced in a width direction, and each of a cross-section in a lengthwise direction of said plurality of prisms is formed in a schematically V-shape.

* * * * *